United States Patent [19]  [11]  4,410,454
Faschingbauer  [45]  Oct. 18, 1983

[54] NOBLE METAL AND RARE EARTH METAL CATALYST

[75] Inventor: Gerald L. Faschingbauer, Bloomer, Wis.

[73] Assignee: UOP Inc., Des Plaines, Ill.

[21] Appl. No.: 353,790

[22] Filed: Mar. 2, 1982

[51] Int. Cl.³ .................. B01J 23/10; B01J 23/12; B01J 23/40
[52] U.S. Cl. .................. 502/306; 204/43 N; 502/320; 502/326; 502/314; 502/315
[58] Field of Search .............. 252/462; 204/37 R, 40, 204/43 N, 43 R, 45, 290 R; 428/656, 670

[56] References Cited

U.S. PATENT DOCUMENTS

| | | | |
|---|---|---|---|
| 2,658,742 | 11/1953 | Suter et al. | 263/3 |
| 3,867,313 | 2/1975 | Brewer | 252/465 |
| 3,918,139 | 11/1975 | Felten | 428/670 X |
| 3,993,572 | 11/1976 | Hinden et al. | 252/462 |
| 3,997,651 | 12/1976 | Bocciarelli | 423/213.2 |
| 4,118,199 | 10/1978 | Volker et al. | 422/171 |
| 4,140,655 | 2/1979 | Chabot et al. | 252/462 |
| 4,162,235 | 7/1979 | Acres et al. | 252/462 |

*Primary Examiner*—W. J. Shine
*Attorney, Agent, or Firm*—James R. Hoatson, Jr.; Louis A. Morris; Wailliam H. Page, II

[57] ABSTRACT

The composition, use and manufacture of a catalyst comprising a noble metal, a rare earth metal and a metallic support with the noble and rare earth metal being electroplated on the metallic support. A preferred composition is lanthanum, platinum and palladium on a nickel chromium alloy support. The catalyst has utility in the oxidation of fumes comprising industrial waste gases and in the oxidation of components of automotive exhaust gases.

19 Claims, No Drawings

NOBLE METAL AND RARE EARTH METAL CATALYST

BACKGROUND OF THE INVENTION

This invention relates to oxidation catalysts. More particularly this invention comprises a new composition of catalyst, method of making the catalyst and processes for its use.

The prior art is replete with teachings of the use of all metal catalyst elements, as well as teachings of the preparation of such types of catalysts, in connection with the treating of noxious gases and vapors. The advantage of a catalytic incineration of volatile combustion materials from industrial processing operations resides in the lowered heat requirements and the large resulting annual savings in fuel costs such that a higher installation cost can be quickly offset. For example, a thermal incineration operation for a gaseous stream may require a temperature in the range of 1100° to 1500° F.; while, on the other hand, the catalytic operation may be carried out at an inlet temperature range of from 600° to 700° F. The fuel savings are obvious.

The all metal catalyst units may be made in various forms, as for example, as one or more layers of coated screen of different gauges and meshes, short lengths of coated wire or ribbon in coiled form, coated mats of crinkled wire or of crimped strands of ribbon, etc. A popular form of unit has comprised a mat of crinkled or crimped thin and narrow ribbon placed between retainer screens of wire mesh. The elements have been made in various thicknesses, ranging from about 1 to 3 inches in thickness. Also, it has been of advantage to place the wire or mat portions of the elements into stainless steel frames such that they can be readily placed and held in an exhaust gas stream flow path.

The base materials for the noble metal coatings used in the heretofore known types of elements have been of special high nickel content alloys of various types, such as Chromel, Nikrothal, and Nickrome, (which are the trade names for, respectively, an alloy of nickel and chromium and an alloy of nickel, chromium and iron). These alloys provided the desired requirements of having high thermal and electrical resistance in comparison to the usual or more widely used stainless steels that had lower nickel content.

A specific example of such an earlier teaching is as set forth in U.S. Pat. No. 2,658,742 to Suter et al. Suter et al discloses the use of a noble metal supported on a metallic alloy for use in the catalytic incineration of combustible vapors. The noble metal may, in accordance with Suter et al, be deposited on the base alloy by electroplating which was stated to be the preferred method of deposition because it prevents a replacement reaction whereby the noble metal replaces a base metal which enters and contaminates the plating solution.

U.S. Pat. No. 3,867,313 to Brewer also discloses the use of an incineration catalyst made by electroplating a noble metal on an alloy base. Brewer, however, teaches that the problem of dissolved cation impurities from the base metal still arises even though the method of plating is not based on the replacement reaction. Brewer solves that problem by circulating the plating solution through a cation exchange resin. Brewer also teaches the conditioning of the catalyst by contacting it at high temperature with a mixture of hydrocarbon combustion gases and hydrocarbon vapors.

U.S. Pat. No. 3,208,131 to Ruff et al discloses a catalyst unit in suitable form for use as an automotive exhaust gas catalytic converter. The unit comprises spirally wound alternating layers of crimped and flat alloy ribbon to form a honeycomb-like passage for the gases. The ribbon is coated with a thin layer of noble metal to achieve the catalytic effect.

U.S. Pat. No. 4,162,235 to Acres et al discloses the possibility of a catalyst composition containing a noble metal and a rare earth metal carried by a substrate which may be a metal, in which case a perovskite must also be present, or a composition without the perovskite, in which case a support comprising a refractory oxide is employed in addition to the substrate. The only specific means suggested for adding the rare earths and noble metals to the support or substrate is by impregnation or "dipping". No mention is made of electroplating.

Other references in the art disclosing various rare earth-noble metal combinations for use as oxidation catalysts are U.S. Pat. No. 3,993,572 to Hindin et al, U.S. Pat. No. 4,140,655 to Chabot et al, U.S. Pat. No. 4,118,199 to Volker et al and U.S. Pat. No. 3,997,651 to Bocciarelli et al. None of these references suggests electroplating as a means of introducing active metals to support materials, nor, of course, the specific details of an electroplating procedure which, as will be hereinafter discussed, are preferred by the present invention.

SUMMARY OF THE INVENTION

The present invention, in one embodiment, is a catalyst composition comprising a noble metal, a rare earth metal and a metallic support, the noble metal and the rare earth metal having been electroplated on the metallic support.

In a second embodiment, the present invention is a method of manufacture of a catalyst composition comprising electroplating a noble metal and a rare earth metal on a metallic support.

In still another embodiment, the present invention is a process for the catalytic oxidation of noxious fumes comprising contacting the fumes at oxidation conditions with a catalyst composition comprising a noble metal, a rare earth metal and a metallic support, the noble metal and the rare earth metal having been electroplated on the metallic support.

Other embodiments of the invention relate to details such as specific compositions and conditions utilized in the catalyst manufacture and use thereof, all of which will hereinafter be discussed at length.

DETAILED DESCRIPTION OF THE INVENTION

This invention relates to providing an all metal, catalyst element, or unit, which is high temperature resistant and of particular advantage in effecting the catalytic incineration of noxious fumes such as may originate from industrial ovens, where such ovens are drying or baking enamels, varnishes, or other surface coatings. Additionally, these elements may well be used to advantage for hydrogen and oxygen recombination or for various specific chemical reactions which are to be catalytically promoted, such as the reduction of nitrogen oxides, as well as for the catalytic conversion of automobile engine exhaust gases to less noxious gaseous components. The present improved catalyst elements utilize a cleaned and etched base material for a noble metal and rare earth metal coating, with the base comprising a metal or metal alloy such as nickel-chromium alloys or other "stainless steel" materials. As a result, there is an improved catalyst element with the particular advantage of being less expensive to make because of the reduced noble metal. Another advantage of the present invention is the hereinafter discussed surprising effect of having a rare earth salt (particularly a lanthanum salt) in the electroplating solution with the noble metal salt.

At the present time, where air pollution is such an important consideration, it is particularly important to carry out the incineration of a greater number of exhaust gas streams, as well as treat more types of fumes and gases. As a result, it is of especial importance to provide more economical means as well as find efficient long-life catalysts, to effect the desired catalytic incinerations and it may be considered a particular object of the present invention to provide an improved lower cost catalyst element.

As hereinbefore set forth, the present invention makes use of a heat resistant base or support material which comprises a metal or metal alloy from the group chromium, iron, nickel, cobalt or aluminum, preferably a nickel chromium alloy. This metal may be in the form of wire, screen, wire-mesh, ribbon, or other physical form, depending upon the size of the catalyst unit desired, or the total surface area desired. In smaller units, for industrial incinerator applications, there may be one or more layers of coated screening to comprise the catalyst unit, while on the other hand, where it is desirable to have substantial thickness and a large surface area that is coated to comprise the one or more catalyst elements used in an incineration installation, there may be a thick mat or crimped or crinkled ribbon which has been coated with the desired one or more noble and rare earth group metals. For convenience in handling, there can be thin and narrow crimped ribbon loosely and randomly compressed into a mat form and contained between two spaced screen members. Such mats will then appear similar to crinkled metal ribbon filter elements and be readily adapted for positioning in an exhaust gas stream flow path. Any one mat may provide several square feet of transverse area to the gas stream or, alternatively, a given passageway may be transversed by a plurality of mat-like elements which are of the order of 2 to 4 square feet that are, in turn, positioned in an edge-to-edge relationship in the form of a catalyst wall.

With regard to automotive applications, the form of base metal as disclosed in the aforementioned U.S. Pat. No. 3,208,131, incorporated herein by reference, would be preferred.

Prior to the deposition of the noble metal coating, there should be a cleaning of the metal with a strong detergent cleaner or other suitable grease removing compound. Following a cleaning and rinsing, there is also preferably carried out a mild etching of the metal until there is some dullness or porosity provided on the surface of the base material, as for example, with a hydrochloric acid solution, or with hydrochloric acid together with ferric chloride. The etching operation may then be followed by further rinsing in water or in a mild detergent solution so as to be ready for the noble and rare earth metal group deposition. This deposition is effected by electroplating so as to effect a uniform coating of the desired metals, over the entire surface of the base element. For example, a solution may be prepared by adding platinic and lanthanum chlorides in hydrochloric acid to provide a plating solution and the base element as a mat, screen, or other form, is immersed into the solution while being connected to the negative pole (cathode) of the electroplating operation. Carbon rods can be used to serve as the positive pole or anode and the plating operation is carried on for a period of time sufficient to obtain up to about 0.1 mm thickness of coating. Generally, the time period will be less than about 5 minutes. Also, the operation should be carried out to preclude evolution of hydrogen from the plating solution, which solution is normally heated to be in the temperature range of 160° to 180° F. The quantity of rare earth metal deposited may range from about 0.1 to about 1.0 weight percent of the catalyst composition and the quantity of noble metal may be a like amount, with the remainder of the composition consisting essentially of the metallic support.

It is important at this point to note fundamental departures in the method of preparation of the catalyst composition of the present invention from the above discussed prior art. One such departure is the electroplating of the noble metal and rare earth metals on the base metal as opposed to the immersion or impregnation taught, e.g. by Acres et al. This difference in methods of manufacture is relevant not just with regard to such method but also to the finished catalyst composition itself. The physical characteristics of the electroplated vs. impregnated catalyst are distinctly different, at least in the respect of the former having a very uniform and closely controlled coating of the desired metals over the entire surface of the base element. There is also a chemical nature to electroplating whereby the atoms of the deposited metals share electrons with the atoms of the base metal and are thereby associated with the base metal in a manner distinct from the relatively less stable association of the atoms of the different constituents of an impregnated catalyst.

Another fundamental departure in the method of preparation of the catalyst composition of the present invention as compared to the prior art methods, e.g. the method of Brewer, is the preferred simultaneous electroplating of the noble metal and rare earth metal from a common solution of salts of those metals. Simultaneous electroplating is preferred not just because of the step saving aspects of depositing the metals from a common solution, but also because of the fact that, at least with regard to lanthanum, a surprising discovery has been made that the presence of the rare earth in the solution minimizes the replacement reaction which causes contamination of the solution with base metal cation impurities and thereby precludes the need for solution purification, as required in Brewer, by use of an expensive and troublesome ion exchange resin system. The rare earth, particularly lanthanum, thus not only results in an effective oxidation catalyst of reduced noble metal content, but in fact facilitates and improves the manufacture of that catalyst.

Following the plating of the base element, there is a rinsing and drying prior to effecting a conditioning or activation of the noble and rare earth metal surface on the coated element. The conditioning or activating operation may be effected in various ways; however, preferably, it is carried out by heating the element at a high temperature of the order of 900° to 1000° F. in the direct path of hot combustion gases from a burner means and in the presence of hydrocarbon, such as heptane, vapors and combustion gases which are continuously fed into the hot combustion gas stream between the burner flame and the coated element. This treating or conditioning provides a "preactivation" of the entire element and can be readily observed to be properly taking place in the firing operation by noting the spread of a bright red glow across the entire surface and through the thickness of the entire element. The resultant cooled surface is dull and of generally dark color that will have porosity and an extended surface area of "active centers".

Generally, the catalyst element, following the cleaning, electroplating and conditioning operations will result in an activated unit ready for commercial use. However, in certain instances where it is desired to have a heavier coat of the noble and rare earth metals and an element with an ensured long life in fume oxidizing service, there may be one or more "recoatings" added by the same electrolytic deposition procedure just described with the unit subjected to the heretofore described rinsing, drying and conditioning operations for each coating.

Different types of coatings may be used to suit different types of oxidizing operations. For example, in addition to the rare earth metal, platinum or palladium alone may be of advantage in a particular incineration operation; while, in other instances, mixtures of platinum and palladium with the rare earth metal may be used to advantage. In still other instances, ruthenium, thorium, iridium, or other platinum group metal, may be combined in small quantities along with platinum or palladium or a mixture thereof and the rare earth metal. Where an additional metal compound is desired in the noble and rare earth metal coating alloy, there may be the addition of the metal salt to the plating bath so that there is a resulting alloying or mixing of the desired metal component into the electroplated surface. The specific combination of rare earth and noble metals considered to be most advantageous is lanthanum with platinum and palladium. Generally, under proper conditions, the plating solution will be such as to provide the deposition of an approximately 0.1 mm thickness of the plating in a period of 5 minutes or less.

The use of rare earths along with noble metal in the processes of this invention offers several advantages. Rare earth metals such as lanthanum and cerium act as catalyst promoters which readily accept oxygen from a gas stream and donate it to a nearby platinum or palladium crystal. The platinum or palladium crystals accept the oxygen from the promoters and perform the catalytic reaction. Using the lanthanum and cerium relieves the noble metal from much of the gas to metal surface oxygen transfer function, freeing it to accept the molecules to be treated and to perform the oxidation-reduction reactions. In short, less noble metal is required to perform a reaction. Lanthanum is much more active as a promoter than cerium, therefore, the noble metal concentration can be reduced more when lanthanum is used. When the catalyst is used to oxidize noxious fumes comprising industrial waste gases or vapors containing hydrocarbons or organic molecules having hydrocarbon groups, the oxidation is effected by contacting the fumes together with oxygen with the catalytic composite, the oxidation conditions comprising a temperature of from about 500° F. to about 1000° F. When the noxious fumes comprise unburned hydrocarbons and carbon monoxide from the exhaust gas of an internal combustion engine, the oxidation is effected by contacting the exhaust gas together with oxygen with the catalytic composite, the oxidation conditions comprising a temperature from about 400° F. to about 1700° F.

A second advantage of using the rare earth is its effect as a catalyst stabilizer. When catalysts with a high loading of noble metal are used for long periods of time in high temperature environments ($>1000°$ F.), the crystals tend to merge together and become larger crystals, resulting in a reduction of exposed surface area and therefore catalyst activity. Using rare earth as a stabilizer/promoter allows for reduced noble metal loadings without loss of activity, thereby allowing for a greater distribution of noble metal. The rare earths may also act as a barrier to noble metal crystal growth by physically separating two or more crystals. Obviously, as lanthanum allows the noble metal to be reduced to lower concentrations than other rare earth metals, it is the preferred stabilizer.

A final note on advantages must be made on the overall economics of lanthanum and cerium. Since the noble metal loadings per catalyst are reduced and replaced with the less expensive rare earths, the cost per catalyst is also reduced, and all without loss of catalyst activity. This is a significant point in light of the rising prices of precious noble metals and the increasing restrictions on the budgets in industry.

It is contemplated that the catalyst of the present invention will have general utility for oxidation of noxious fumes. When the catalyst is used to oxidize noxious fumes comprising industrial waste gases or vapors containing hydrocarbons or organic molecules having hydrocarbon groups, the oxidation is effected by contacting the fumes together with oxygen with the catalytic composite, the oxidation conditions comprising a temperature of from about 500° F. to about 1000° F. When the noxious fumes comprise unburned hydrocarbons and carbon monoxide from the exhaust gas of an internal combustion engine, the oxidation is effected by contacting the exhaust gas together with oxygen with the catalytic composite, the oxidation conditions comprising a temperature from about 400° F. to about 1700° F.

The following example sets forth a procedure and data obtained in testing the catalyst of the present invention as well as prior art catalysts for comparison purposes. This example is presented for illustrative purposes and should not be construed as limiting the scope of the invention.

EXAMPLE

Procedure

The developmental work performed to obtain the following data involved the electrodeposition of lanthanum and cerium along with combinations of noble metals. The base material was a nickel-chrome ribbon (35% Ni—20% Cr—Balance—Fe). The ribbon was crimped, cut to 30–35 inch lengths, meshed and packed into a mat form with metal screens and wire ties holding the ribbon in place. This mat was then cleaned and pickled in various solutions.

The lanthanum and cerium solutions were prepared by dissolving the metals (as chlorides) in water. The elemental noble metals were dissolved in an aqua regia solution. Depending upon the desired costs, various volumes of these solutions were added to the electrolyte. Different metals were deposited simultaneously for those catalysts having a coating of more than one metal.

Carbon rods submerged in the electrolyte served as the anode and the metal mat served as the cathode. A charge (its magnitude depending upon the size of the mat) was passed through the solution, ionizing the dissolved metal. The metal ions traveled to the mat and became bonded. Throughout this operation the mat was continually moved up and down and rotated so as to get an even distribution of metals.

After depositing the initial coat, the mat was placed in a conditioning oven where a hydrocarbon gas (heptane) was passed over it at an elevated temperature. This activated the lanthanum or cerium and the noble metals, plus securing the bond between the metals and the mat. The temperature was raised in the oven until the mat glowed red. After conditioning, the mat was returned to the plating tank for a second coat. Three coats were applied, each coat involving the above conditioning.

Test Results

The reason for using a catalyst is to lower the energy of activation of a particular compound to permit it to oxidize (or reduce) to a lower form through combustion. The lower the energy of activation is, the lower the combustion point will be. For the all metal type of catalysts, the combustion point is referred to as the minimum ignition or take off point and is noted as the temperature at which the metal begins to glow uniformly.

The extent of the lowering of the combustion point is a primary criteria in evaluating the performance of the catalyst. The following table sets forth the data, i.e. minimum ignition temperatures (MIT), obtained with various catalysts used to initiate conbustion of a gaseous heptane-air mixture containing from about 0.1 to about 0.3 volume percent heptane.

| Test Run | Catalyst Composition | MIT |
|---|---|---|
|  | (2.5–3 grams metal coat per pound of base material) |  |
| 1* | 48% La, 52% Pd | 460–480° F. |
| 2* | 51% La, 40% Pd, 9% Pt | 380–400° F. |
| 3* | 48% La, 49% Pd, 3% Pt | 400–420° F. |
| 4* | 53% Ce, 28% Pd, 19% Pt | 380–400° F. |
|  | (4–5 grams metal coat per pound per base material) |  |
| 5 | 60% Pd, 40% Pt | 380–390° F. |
| 6 | 100% Pd | 450–460° F. |
| 7 | 82% Pd, 18% Pt | 400–410° F. |
| 8 | 97% Pd, 3% Pt | 430–440° F. |

*Catalyst of present invention

From the Table above, it may be noted that the platinum and palladium contents are much lower in the lanthanum and cerium catalysts as compared to comparable standard catalysts. The minimum ignition temperatures for the lanthanum and cerium catalysts are also near or lower than those reported for the standard catalysts, making them as good or better.

Brief field experience has shown that the rare earth-noble metal catalysts perform as well as better than the previously used standard coats from the standpoint of conversions obtained and longevity.

I claim:

1. A catalyst composition consisting essentially of a platinum group noble metal, a rare earth metal and a metallic support, said platinum group noble metal and said rare earth metal having been electroplated on said metallic support.

2. The composition of claim 1 wherein said noble metal comprises platinum or palladium, said rate earth metal comprises lanthanum or cerium and said metallic support comprises a metal or metal alloy from the group chromium, iron, nickel, cobalt or aluminum.

3. The composition of claim 2 wherein said rare earth metal comprises lanthanum and said metallic support comprises a nickel-chromium alloy.

4. The composition of claim 3 wherein said noble metal and said rare earth metal are simultaneously electroplated on said metallic support.

5. The composition of claim 1 wherein said noble metal is present in an amount of from about 0.01 to about 1.0 weight percent, said rare earth is present in an amount of from about 0.1 to about 1.0 weight percent and the remainer of said composition consists essentially of said metallic support.

6. The composition of claim 1 where conditioning of said composition is effected by contacting said composition at conditioning conditions with a mixture of hydrocarbon combustion gases and hydrocarbon vapors.

7. The composition of claim 6 wherein said conditioning conditions comprise a temperature from about 900° F. to about 1000° F. and said hydrocarbon vapors comprise heptane vapors.

8. The catalytic composition of claim 1 wherein said metallic support comprises a wire or ribbon and said composition is maintained in the form of a gas permeable mat useful as an oxidation catalyst element.

9. A method of manufacture of a catalyst composition comprising electroplating catalytic metals consisting essentially of a platinum group noble metal and a rare earth metal on a metallic support.

10. The method of claim 9 wherein said noble metal comprises platinum or palladium, said rare earth metal comprises lanthanum or cerium and said metallic support comprises a metal of metal alloy from the group chromium, iron, nickel, cobalt or aluminum.

11. The method of claim 10 wherein said rare earth metal comprises lanthanum and said metallic support comprises a nickel-chromium alloy.

12. The method of claim 11 wherein said noble metal and said rare earth metal are simultaneously electroplated on said metallic support.

13. The method of claim 9 wherein said noble metal is present in an amount from about 0.1 to about 1.0 weight percent, said rare earth is present in an amount of from about 0.1 to about 1.0 weight percent and the remainder of said composition consists essentially of said metallic support.

14. The method of claim 9 where conditioning of said composition is effected by contacting said composition at conditioning conditions with a mixture of hydrocarbon combustion gases and hydrocarbon vapors.

15. The method of claim 14 wherein said conditioning conditions comprise a temperature from about 900° F. to about 1000° F. and said hydrocarbon vapors comprise heptane vapors.

16. The method of claim 9 wherein said metallic support comprises a wire or ribbon and said composition is maintained in the form of a gas permeable mat useful as an oxidation catalyst element.

17. A catalyst composition comprising from about 0.1 to about 1.0 weight percent of metal selected from the group consisting of platinum, palladium and mixtures thereof, and from about 0.1 to about 1.0 weight percent of a rare earth metal, said metals having been electroplated on a metal or metal alloy support.

18. The catalyst composite of claim 17 wherein ruthenium, thorium or iridium is added to said composite.

19. A method of manufacture of a catalyst composition which comprises electroplating on a metal or metal alloy support from about 0.1 to about 1.0 weight percent of a metal selected from the group consisting of platinum, palladium and mixtures of platinum and palladium and from about 0.1 to about 1.0 weight percent of a rare earth metal.

* * * * *